US012644898B2

(12) United States Patent
Gehlen et al.

(10) Patent No.: US 12,644,898 B2
(45) Date of Patent: Jun. 2, 2026

(54) METHOD FOR AN AUTOMATIC INSPECTION OF A MULTIPLICITY OF PLATE-LIKE PLASTIC CARRIERS

(71) Applicant: VMT Vision Machine Technic Bildverarbeitungssysteme GmbH, Mannheim (DE)

(72) Inventors: Stefan Gehlen, Ilvesheim (DE); Frank Gruenewald, Germersheim (DE)

(73) Assignee: VMT Vision Machine Technic Bildverarbeitungssysteme GmbH, Mannheim (DE)

( * ) Notice: Subject to any disclaimer, the term of this patent is extended or adjusted under 35 U.S.C. 154(b) by 204 days.

(21) Appl. No.: 17/949,878

(22) Filed: Sep. 21, 2022

(65) Prior Publication Data

US 2023/0085831 A1      Mar. 23, 2023

(30) Foreign Application Priority Data

Sep. 21, 2021    (DE) .................... 10 2021 004 734.6

(51) Int. Cl.
| | |
|---|---|
| *G01N 35/00* | (2006.01) |
| *G01N 15/06* | (2006.01) |
| *G01N 21/90* | (2006.01) |

(52) U.S. Cl.
CPC ... G01N 35/00732 (2013.01); G01N 15/0606 (2013.01); G01N 21/9081 (2013.01); G01N 35/00613 (2013.01)

(58) Field of Classification Search
CPC ......... G01N 35/00732; G01N 15/0606; G01N 21/9081; G01N 35/00613; G01N 15/0612;

(Continued)

(56) References Cited

U.S. PATENT DOCUMENTS 7,697,750 B2 *    4/2010   Simmons ................. G02C 7/16
                                                                  382/154
7,718,131 B2 *    5/2010   Jiang ....................... B01L 9/523
                                                                  356/326
(Continued)

FOREIGN PATENT DOCUMENTS

DE          102008023936 A1      8/2009
DE          102015210842 B3     12/2016
(Continued)

OTHER PUBLICATIONS

Abu Ebayyeh et al. "A Review and Analysis of Automatic Optical Inspection and Quality Monitoring Methods in Electronics Industry", IEEE Access, 8, 183192-183271(2020).*

*Primary Examiner* — Mohamed K Amara
(74) *Attorney, Agent, or Firm* — Muncy, Geissler, Olds & Lowe, P.C.

(57)          ABSTRACT

A method for an automatic inspection of a plurality of plate-like plastic carriers, whereby each plastic carrier is closed by a cover and has a unique identification code and a culture medium. A storage container including a multiplicity of plastic carriers is provided, and a computer-controlled handling unit including an optical inspection system is provided. While performing the automatic inspection in an inspection routine, a plastic carrier is removed from the storage container with the aid of the handling unit, the cover of the plastic carrier is subsequently removed, the plastic carrier is supplied to the inspection system, the identification code is read, and at least one image of the plastic carrier, including the surface of the culture solution is recorded. The image is evaluated for a growth of germs and/or faults in the plastic carrier and the result of the evaluation is stored for each plastic carrier.

21 Claims, 2 Drawing Sheets

(58) Field of Classification Search
CPC .. G01N 15/1433; G01N 21/94; G01N 21/958;
G01N 2015/019; G01N 2015/1486; G01N
21/95; C12M 41/36; C12M 23/08; C12Q
1/22
See application file for complete search history.

(56) References Cited

U.S. PATENT DOCUMENTS

| | | | | |
|---|---|---|---|---|
| 8,787,633 | B2 * | 7/2014 | Robinson | G06V 20/695 |
| | | | | 382/128 |
| 9,028,752 | B2 | 5/2015 | Malin | |
| 9,109,194 | B2 | 8/2015 | Honda et al. | |
| 9,516,288 | B2 * | 12/2016 | Holub | G01J 3/0272 |
| 9,732,368 | B2 | 8/2017 | Pierquin | |
| 10,824,832 | B2 | 11/2020 | Kluckner et al. | |
| 10,872,226 | B2 | 12/2020 | Jalenques | |
| 2002/0018733 | A1 * | 2/2002 | Kapplein | G01N 35/00732 |
| | | | | 422/67 |
| 2003/0044321 | A1 | 3/2003 | Haslam et al. | |
| 2003/0155528 | A1 * | 8/2003 | Tokuda | C12Q 1/04 |
| | | | | 250/461.2 |
| 2007/0034140 | A1 * | 2/2007 | Thorne | C30B 7/04 |
| | | | | 117/68 |
| 2010/0182419 | A1 * | 7/2010 | Jiang | C12M 23/48 |
| | | | | 348/79 |
| 2010/0291619 | A1 * | 11/2010 | Robinson | G01N 35/0099 |
| | | | | 435/288.7 |
| 2010/0315628 | A1 * | 12/2010 | Mertsching | G01N 21/65 |
| | | | | 356/301 |
| 2012/0251275 | A1 * | 10/2012 | Malin | G01N 35/0099 |
| | | | | 211/59.4 |
| 2013/0129181 | A1 * | 5/2013 | Glensbjerg | G02B 21/125 |
| | | | | 382/133 |
| 2013/0194410 | A1 * | 8/2013 | Topman | G06V 20/69 |
| | | | | 382/133 |
| 2014/0160236 | A1 * | 6/2014 | Ozcan | G01B 9/021 |
| | | | | 348/40 |
| 2015/0118688 | A1 * | 4/2015 | Weidemaier | G01N 33/54333 |
| | | | | 422/522 |
| 2015/0324969 | A1 * | 11/2015 | DenBrok | G06V 20/698 |
| | | | | 382/110 |
| 2016/0025756 | A1 * | 1/2016 | Pollack | G01N 35/00603 |
| | | | | 422/65 |
| 2017/0219485 | A1 * | 8/2017 | Bae | G01N 21/47 |
| 2018/0079999 | A1 * | 3/2018 | Blanchard | C12M 23/16 |
| 2018/0129864 | A1 * | 5/2018 | Robinson | G02B 21/365 |
| 2018/0211095 | A1 | 7/2018 | Jalenques | |
| 2019/0008388 | A1 * | 1/2019 | Ando | G01J 3/00 |
| 2020/0342604 | A1 | 10/2020 | Wiles et al. | |
| 2021/0081647 | A1 | 3/2021 | Jalenques | |
| 2021/0146368 | A1 * | 5/2021 | Rein | G01B 11/105 |
| 2023/0085831 | A1 * | 3/2023 | Gehlen | G01N 15/0606 |
| | | | | 206/315.9 |
| 2024/0225454 | A9 * | 7/2024 | Islam | A61B 5/0075 |

FOREIGN PATENT DOCUMENTS

| | | |
|---|---|---|
| DE | 102018000437 A1 | 7/2018 |
| EP | 2497823 A1 | 9/2012 |
| EP | 2807484 B1 | 5/2016 |
| EP | 2482079 A2 | 1/2021 |
| WO | WO2016133908 A1 | 8/2016 |

* cited by examiner

METHOD FOR AN AUTOMATIC INSPECTION OF A MULTIPLICITY OF PLATE-LIKE PLASTIC CARRIERS

This nonprovisional application claims priority under 35 U.S.C. § 119(a) to German Patent Application No. 10 2021 004 734.6, which was filed in Germany on Sep. 21, 2021, and which is herein incorporated by reference.

BACKGROUND OF THE INVENTION

Field of the Invention

The present invention relates to a method for an automatic inspection of a multiplicity of plate-like plastic carriers.

Description of the Background Art

An inspection of plate-like plastic carriers, also referred to as Petri dishes, is used, in particular, in the area of environmental and hygiene monitoring. In the area of the food industry, pharmaceutical industry, and the medical industry, in particular, ensuring the cleanliness or freedom from germs is an essential prerequisite for production.

Devices and methods for storing and handling plastic carriers are known from US 2003/0044321, EP 2 482 079 B1 (which corresponds to US 2012/0251275), DE 10 2015 210 842 B3, EP 2 807 484 B1 (which corresponds to US 2015/0031119), DE 10 2018 000437 A1 (which corresponds to US 2018/0211095), and US 2021/0081647.

The particular plastic carriers are generally designed as dishes and include a cover. The opened dishes are brought into contact with the medium to be inspected and subsequently closed again. After a storage at a predefined temperature and for a predefined time to permit a growth of any germs that may be absorbed, the plastic carriers are subsequently examined manually by trained personnel.

If a germ growth or another fault of the medium or the plastic carriers is detected, the result of the examination is positive, otherwise it is negative.

All dishes are essentially to be reliably examined with the same quality, a clear identification of the particular plastic carriers being important due to a tracking of the plastic carriers. Among other things, it is disadvantageous that the results of the examination are varied and insufficiently free of errors depending on the personnel, and the examination as a whole is extremely time-consuming and cost-intensive.

In addition to the visual examination of the dishes, the documentation of the results is also time-consuming and cost-intensive. Requirements on the process side or even governmental ones must usually be observed for the documentation, for example for the scope, preservation period, and/or data integrity of the inspection results.

In the area of company environmental and hygiene monitoring, in particular, the vast majority of the inspected plastic carriers are negative, i.e., no germ growth, in particular, may be detected.

In the case of a positive test result, further measures are usually necessary. The plastic carriers are re-inspected and, in particular, a determination and type classification of all existing germs or microorganisms are carried out with the aid of further analyses. It is desirable that, if possible, all detection results of an automatic inspection system are prepared and documented in such a way that the further inspections of the plastic carriers are simplified, thereby saving additional costs.

SUMMARY OF THE INVENTION

It is therefore an object of the present invention to provide a method which refines the prior art.

According to an exemplary embodiment of the invention, a method is provided for an automatic inspection, i.e., for carrying out an inspection routine for a multiplicity of plate-like plastic carriers.

Each plastic carrier can be closed by a cover and has a unique identification code.

The plastic carrier also can have a culture medium.

A storage container including a multiplicity of plastic carriers may also be provided.

A computer-controlled handling unit including an optical inspection system can be furthermore provided.

At least the following method steps are carried out when performing the automatic inspection in an inspection routine.

A plastic carrier is removed from the storage container with the aid of the handling unit.

The identification code of the plastic carrier is preferably read in one method step.

It should be noted that the sequence of the two method steps is not fixed.

The identification code of at least one of the plastic carriers can be read and stored while the plastic carriers are still situated in the storage container.

In the subsequent method step, a plastic carrier, whose cover is closed, is removed from the storage container with the aid of the handling unit, the identification code of the removed plastic carrier being known from the preceding method step.

The storage container can have an opening or a transparent area on its upper side. This makes it possible to particularly easily and advantageously read the identification code before the plastic carrier is removed with the aid of the handling unit.

Also, the identification code can be detected with the aid of a stationary reading unit. The reading unit is preferably arranged directly above the storage container. One advantage is that the entire cycle time may be reduced by determining the identification code of the plastic carriers in the storage container. In the present case, the period of time between two removals of the plastic carriers from the storage container immediately following each other is referred to as the cycle time.

A plastic carrier, whose cover is closed, may be removed from the storage container with the aid of the handling unit, and the identification code of the plastic carrier is read and stored in the subsequent method step.

The cover of the plastic carrier may be removed in a subsequent method step.

Afterwards, i.e., after the removal of the cover, the plastic carrier is supplied to the inspection system.

It should be noted that the reading of the identification code may also be carried out after the removal of the cover or also by the inspection system itself.

At least one image of the plastic carrier, including the surface of the culture solution, is recorded.

In a subsequent evaluation step, the at least one image is evaluated for a growth of germs and/or faults in the plastic carrier, and/or detects in the surface of the culture medium, and/or damage to the plastic carrier, and/or an impermissible labeling of the plastic carrier.

The result of the evaluation is then stored for each plastic carrier, including assignment to the particular identification code.

The inspection routine is subsequently carried out multiple times. In other words, in a subsequent method step, a further plastic carrier is removed from the storage container with the aid of the handling unit.

It should be noted that, in general, the culture medium is usually gelatinous to solid. However, it is understood that, in one refinement, the culture medium may also be present as a liquid.

It should furthermore be noted that the plate-like plastic carriers are generally designed as dishes. The plastic carriers are preferably provided with a round design and are generally referred to as so-called Petri dishes.

It is understood that the identification code can be designed as a QR code or barcode or as a data matrix code, for example. The machine-readable codes are designed, in particular, for a fast and secure reading out of the contained information by means of scanners or cameras.

The identification code can be formed in plain text, the plain text of an automatic optical character recognition (OCR) process being able to be detected and processed by scanners and cameras.

The identification code can comprise or is made up of a combination of plain text and machine-readable code.

It should be noted that the identification code as well as the label are attached to the plastic carrier or applied to the plastic carrier in a direct printing process.

The plastic carriers may have a diameter in a range between 50 mm and 300 mm or a diameter of 55 mm and 90 mm.

It should also be noted that, in particular, it is useful to check for an impermissible label. An impermissible label is understood to be, in particular, a handwritten label using a felt-tipped pen. Many laboratories or users still label plastic carriers by hand. Plastic carriers of this type may be marked faulty during the automated inspection.

It should also be noted that, for example, the plastic carriers, in particular in the form of plastic dishes, the covers of the plastic carriers, and the culture medium may have faults which must be detected during the inspection.

Faults of this type are, in particular, cracks, broken-off or fractured sections, in particular in the edge region, as well as discolorations or blisters. faults in the plastic parts increase the risk that further germs enter the plastic carrier after sampling and falsify the analysis results.

The medium itself may contain, for example, impurities, bubbles, or discolorations, which must be detected as faults. It is also possible that the plastic carrier is covered by only a portion of the medium.

It is known that further possibilities of faults must also be considered during the automatic inspection, for example the formation of condensation and water droplets.

An advantage of the method is that a multiplicity of plate-like plastic carriers may be automatically inspected with consistently the same quality, and the result of the inspection is automatically further processed or may be automatically further processed. An intervention by the user may be substantially reduced or even avoided entirely. Moreover, the fault rate, i.e., the number of incorrectly evaluated plastic carriers, is greatly reduced and the throughput is increased.

A further advantage of the method is that all areas of the plastic carriers are inspected and, in particular, all difficult-to-detect parts of the plate, for example in the edge area, may be automatically inspected with high precision and reliability.

Due to the use of the method according to the invention, different growth zones, among other things, may be detected on the plastic carrier. In one or multiple images, the germs may also be automatically evaluated with the aid of a computer and the results separated and assigned to individual germs using computer-supported methods.

The number of all germs on a plastic carrier may additionally be ascertained after the at least one germ has been detected.

During the automatic analysis of the plastic carriers, in particular, the number of detected germs, properties of the detected colonies, such as size, color, or homogeneity, or even a type determination of the individual germs is ascertained when obtaining the analysis results.

The colonies detected by the inspection system, including features ascertained with reference images or from image recordings of the colonies, can be compared with the features of images of known germ growth processes and assigned for the purpose of the type determination.

The comparison with references for detecting the germ growth in the images and, in particular, for segmentation and counting colonies as well as the type determination or assignment of images to germ types, including, among other things, bacteria and fungi with corresponding subgroups, significantly simplify the evaluation.

The result of the evaluation and the identification code can be assigned to each other and stored for each plastic carrier inspected.

If a single fault is detected in the evaluation step, the plastic carrier is evaluated as bad, or if no fault is detected in the evaluation step, the plastic carrier is evaluated as good.

The retention unit can have an area for storing the plastic carriers evaluated as bad.

The retention unit can have an area for storing the plastic carriers evaluated as good. In another refinement, the area for storing the plastic carriers evaluated as good is designed as a disposal unit.

It is understood that each method step or handling step can be stored in a computer or database system in a clearly trackable manner for each plastic carrier unit.

The plastic carriers can be designed as settling plates or contact plates.

An image of the cover can be recorded, and the image of the cover can be evaluated for damage in the evaluation step.

Multiple images are recorded at a single viewing angle or from multiple viewing angles with the aid of the inspection unit.

Different light sources or viewing angles can be selected for recording the multiple images. The error rate is greatly reduced hereby.

In particular, it is helpful for an analysis of the culture medium or the plastic carrier to carry out a transmitted light illumination in addition to a, for example, diffuse illumination in incident light. It has furthermore been proven that germs or faults in the dishes may be particularly easily and reliably detected with the aid of special light sources, for example UV sources, and by means of evaluating the fluorescence.

The participating cameras can be set to different focal planes or to different areas of the plastic carriers during the recording of multiple images. In other words, the focal planes of the multiple images are set to different object areas for the analysis of the culture medium or the plastic carrier. For example, the surface of the culture medium thus represents a first focal plane and the underside of the plastic carrier a second focal plane.

Different focal planes may be achieved, for example, by multiple differently focused cameras or an active, motordriven adjustment of the lens of a camera, or an active changing of the distance from the plastic carrier and camera.

The evaluation of multiple images, viewing angles, focal planes, and/or illumination sources is particularly suitable to reliably detect a germ growth in certain areas of the plastic carriers and, in particular, in the edge area of the plastic carriers. The type of evaluation is, however, advantageous in reliably detecting faults in the culture medium or detects in or on the plastic dish.

Moreover, it has been proven that, by evaluating multiple images, viewing angles, focal planes, and/or illumination sources, certain properties of the plastic carrier itself may be detected and not incorrectly marked as faults, for example loops, lattice structures, symbols, or product identifiers contained in the plastic carrier.

For the purpose of quality assurance, images of test specimens or reference specimens are recorded at certain time intervals, and the result of the evaluation of the images is compared with predefined data. If a difference between the evaluation and the predefined reference data exceeds a limit value, a diagnosis or calibration is carried out.

The handling unit can be designed as part of a robot.

In a further method step, the plastic carrier can again be provided with the cover and subsequently supplied to a retention unit.

The plastic carrier can be supplied to a disposal unit with or without the cover. It is understood that the disposal is noted, taking into account the identification code.

Also, all inspection steps and test results as well as any user accesses may be detected, documented, and provided via an interface, depending on the identification code. One advantage is that all information may be easily provided hereby, in particular for an audit.

The method may be used for an environmental or hygiene monitoring.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1A:
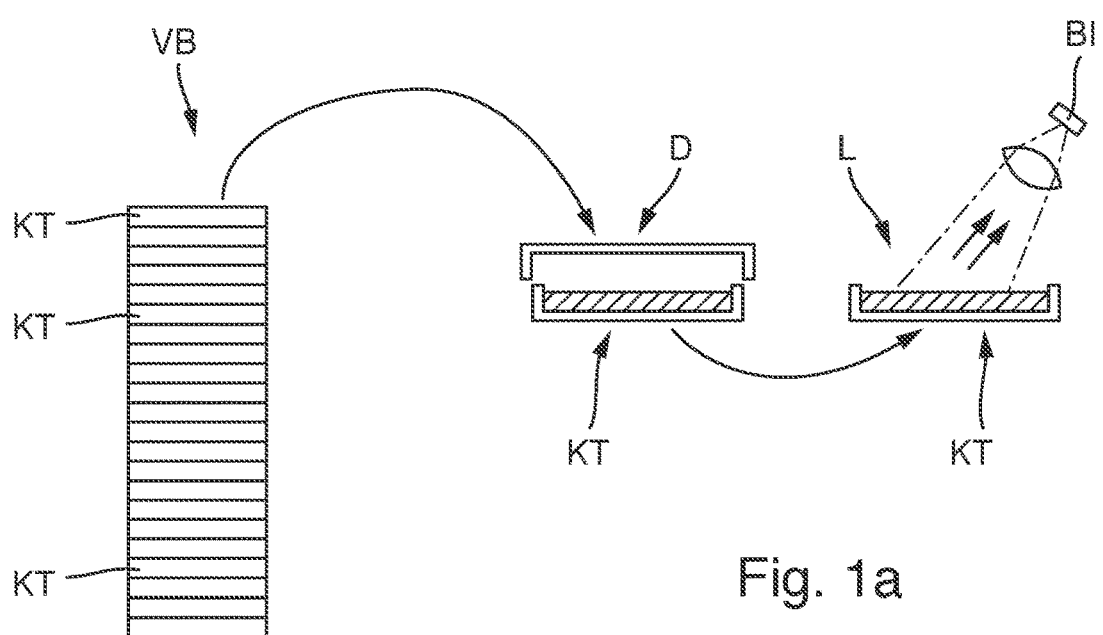
FIG. 1a shows a representation of an optical inspection.

The illustration in FIG. 1a shows a representation of the optical inspection using a stack of plastic carriers KT in a storage area VB.

Topmost plastic carrier KT, whose cover is closed, is gripped from the stack with the aid of a handling unit, which is not illustrated, and cover D of the plastic carrier is removed in one part of the handling unit. Plastic carrier KT is optically inspected with the aid of light L of a light source, in that at least one image is recorded with the aid of camera unit BI. In one refinement, which is not illustrated, cover D is also optically inspected.

Figure 1B:
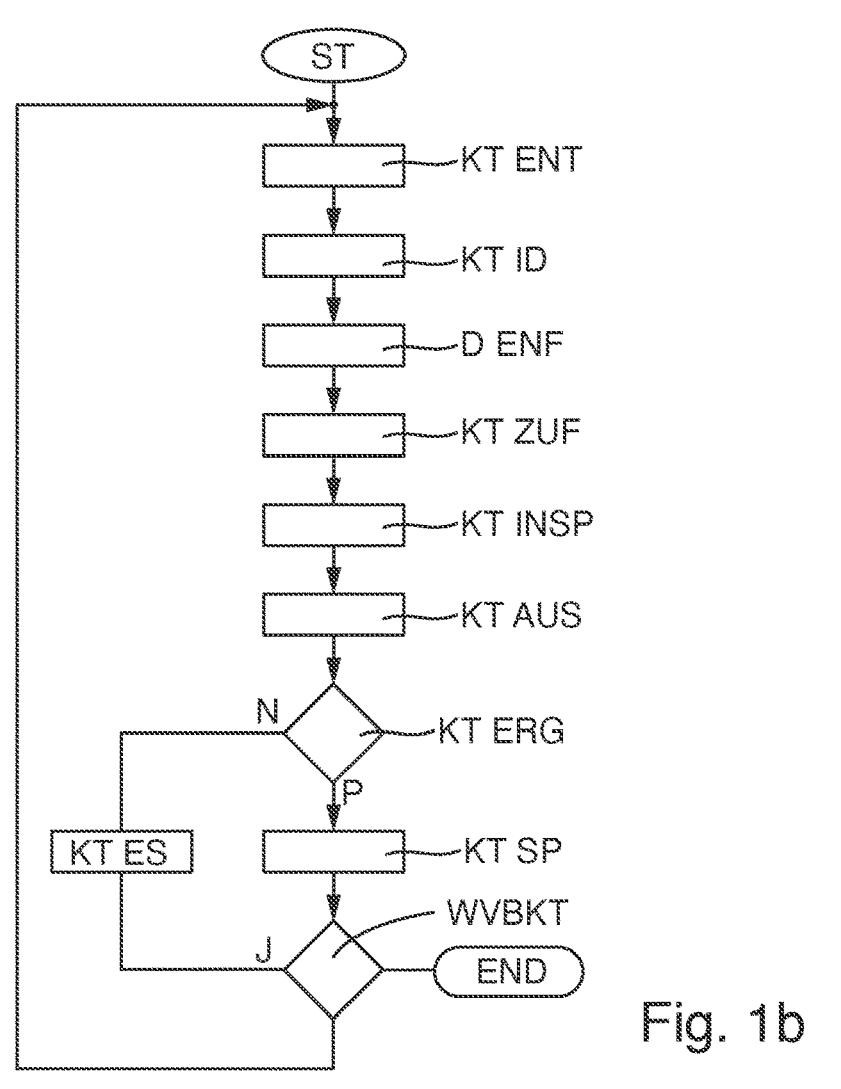
FIG. 1b shows a flowchart for a first example of the method according to the invention.

A flowchart for a first specific embodiment of the method is shown in FIG. 1b, only the differences from the specific embodiment illustrated in connection with FIG. 1a being explained.

In a method step KTENT, plastic carrier KT, whose cover D is closed, is removed from storage container VB with the aid of the handling unit. In a method step KTID, the identification code of plastic carrier KT is read and stored. In a subsequent method step DENF, cover D is removed.

In a further method step KTZUF, plastic carrier KT is stored in the part having the optical inspection unit. In a further method step KTINSP, the surface of the plastic carrier is illuminated with the aid of light L, and at least one image is recorded with the aid of sensor unit BI.

In a subsequent method step KTAUS, the image is evaluated. If the result is negative N in evaluation step KTERG i.e., if, in particular, no germ growth or fungal grown is detected, plastic carrier KT is supplied to a disposal unit in a subsequent method step KTES.

If the result is positive P in evaluation step KTERG i.e., if, in particular, a germ growth or fungal grown is detected, plastic carrier KT is supplied to a retention unit in a subsequent method step KTSP. In one refinement, further analysis steps are carried out in evaluation step KTERG, for example with regard to ascertaining the number of germs and the type of the germs.

After method step KTES as well as after method step KTSP, a check is made in a query step WVBKT whether further plastic carriers KT are to be inspected.

If the result of the check is No N, the method is ended. If the result of the check is Yes J, the method is repeated from the beginning, and next plastic carrier KT is removed from storage container VB.

Figure 1C:
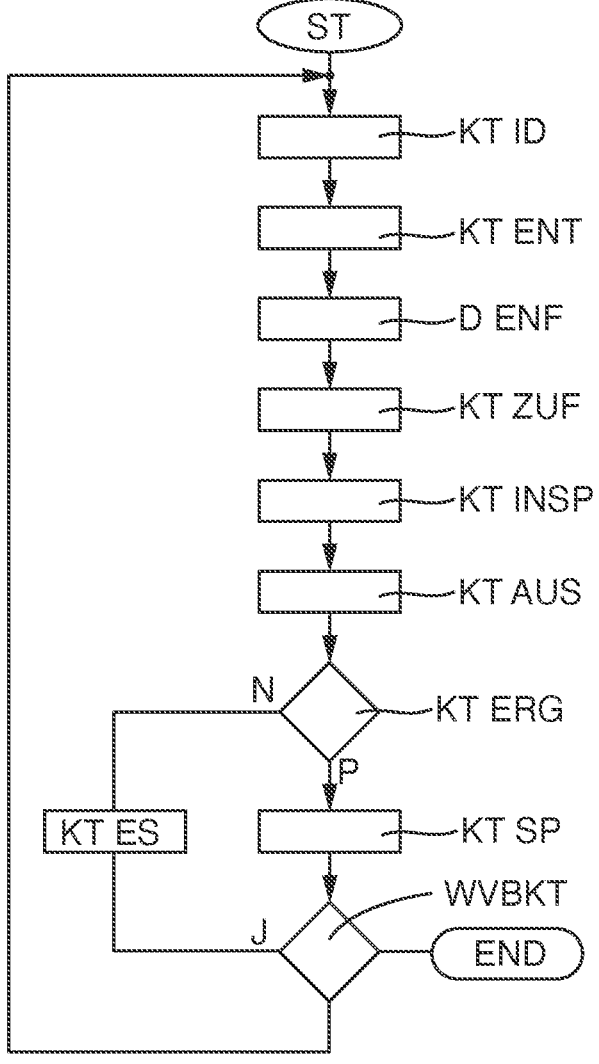
FIG. 1c shows a flowchart for a second example of the method according to the invention.

A flowchart for a second specific embodiment of the method is shown in FIG. 1c, only the differences from the specific embodiment illustrated in connection with FIG. 1b being explained.

While plastic carrier KT is sill arranged in storage container VB, identification code ID of at least one of plastic carriers KT is read and stored in method step KT ID.

In subsequent method step KT ENT, a plastic carrier, whose cover D is closed, is removed from storage container VB with the aid of the handling unit, identification code ID of plastic carrier KT being known from preceding method step KT ID. In a subsequent method step DENT, cover D is removed.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for an automatic inspection of a plurality of plate-like plastic carriers, each plastic carrier being closed by a cover and having a unique identification code and a culture medium, the method comprising:

providing a storage container including the plastic carriers;

providing a computer-controlled handling unit including an optical inspection system, the computer-controlled handling unit being designed as a part of a robot; and performing the automatic inspection in an inspection routine, the inspection routine comprising:

removing one of the plastic carriers from the storage container with the aid of the handling unit;

subsequently removing the cover of the one of the plastic carriers;

supplying the one of the plastic carriers to the optical inspection system;

reading the identification code of the one of the plastic carriers before or after the one of the plastic carriers is removed from the storage container;

recording at least one image, with a light, of the one of the plastic carriers including a surface of the culture medium;

during said recording the at least one image, simultaneously mapping an entire surface of the one of the plastic carriers to a camera unit;

in an evaluation step, evaluating the at least one image for faults as a growth of germs, faults in the surface of the culture medium, and damage to the one of the plastic carriers; and storing a result of the evaluation step, wherein the inspection routine is performed multiple times, wherein multiple images are recorded at a single viewing angle or from multiple viewing angles with the aid of the inspection unit, wherein different illumination sources are used for recording the multiple images, the illumination sources carrying out a transmitted light illumination and a diffuse illumination in incident light, wherein, after the germs are detected, a type classification is carried out for each germ, and wherein the handling unit is configured to automatically load the optical inspection unit.

2. The method for an automatic inspection according to claim 1, wherein the result of the evaluation and the identification code are assigned to each other and stored for each plastic carrier inspected.

3. The method for an automatic inspection according to claim 1, wherein, if a single fault is detected in the evaluation step, the plastic carrier is evaluated as bad, or if no fault is detected in the evaluation step, the one of the plastic carriers is evaluated as good.

4. The method for an automatic inspection according to claim 3, wherein the storage unit has an area for storing the one of the plastic carriers if it is evaluated as bad and an area for receiving the one of the plastic carriers if it is evaluated as good.

5. The method for an automatic inspection according to claim 1, wherein the plastic carriers are designed as settling plates or contact plates.

6. The method for an automatic inspection according to claim 1, wherein an image of the cover is recorded and, in the evaluation step, the image of the cover is evaluated for damage.

7. The method for an automatic inspection according to claim 1, wherein multiple focal planes are used for recording the multiple images.

8. The method for an automatic inspection according to claim 1, wherein, for quality assurance, images of test specimens are recorded, and the images are subsequently evaluated, and the result of the evaluation is compared with predefined data, and if a difference between the evaluation and the predefined data exceeds a limit value, inspection routines are carried out.

9. The method for an automatic inspection according to claim 1, further comprising providing the one of the plastic carriers with the cover again and supplying the one of the plastic carriers to a storage unit.

10. The method for an automatic inspection according to claim 1, wherein the inspection routine, evaluation results are detected and documented and output via an interface.

11. The method for an automatic inspection according to claim 1, wherein the identification code of the one of the plastic carriers in the storage container is read and determined prior to removing the one of the plastic carriers.

12. The method for an automatic inspection according to claim 1, further comprising:

recording an image of the cover; and evaluating the image of the cover for damage in the evaluation step.

13. The method for an automatic inspection according to claim 1, wherein said evaluating is conducted with a single light source.

14. The method for an automatic inspection according to claim 1, wherein said subsequently removing the cover of the one of the plastic carriers is done with the handling unit.

15. The method for an automatic inspection according to claim 1, wherein an entire area of the plastic carriers is inspected.

16. The method for an automatic inspection according to claim 1, wherein the incident light is predominately diffuse.

17. A method for an automatic inspection of a plastic carrier, the plastic carrier being closed by a cover and having an identification code and a culture medium, the method comprising:

providing a storage container including the plastic carrier;

providing a computer-controlled handling unit including an optical inspection system; and performing the automatic inspection in an inspection routine, the inspection routine comprising:

removing, using the handling unit, the plastic carrier from the storage container;

placing the cover of the plastic carrier in the handling unit;

subsequently removing the cover of the plastic carrier;

supplying the plastic carrier to the optical inspection system;

reading the identification code of the plastic carrier before or after the plastic carrier is removed from the storage container;

recording an image, with a light, of the plastic carrier including a surface of the culture medium;

evaluating the image for a growth of germs, faults in the plastic carrier, faults in the surface of the culture medium, and damage to the plastic carriers; and storing a result of said evaluating, wherein, when recording the image, an entire surface of the plastic carrier and the cover is shown at a same time on a camera unit, wherein the inspection routine is performed multiple times, wherein different illumination sources are used for recording multiple images, the illumination sources carrying out a transmitted light illumination and a diffuse illumination in incident light.

18. A method for an automatic inspection of a plurality of plastic carriers, each plastic carrier being closed by a cover and having an identification code and a culture medium, the method comprising:

providing a storage container including the plurality of plastic carriers;

providing a computer-controlled handling unit including an optical inspection system; and performing the automatic inspection in an inspection routine, the inspection routine comprising:

removing, using the handling unit, the plurality of plastic carriers from the storage container;

placing the cover of each of the plurality of plastic carriers in the handling unit;

subsequently removing the cover of the plurality of plastic carriers;

supplying the plurality of plastic carriers to the optical inspection system;

reading the identification code each of the plurality of plastic carriers before or after the plurality of plastic carriers is removed from the storage container;

recording an image, with a light, of each of the plurality of plastic carriers including a surface of the culture medium;

in an evaluation step, evaluating the images for a growth of germs and faults in the plastic carrier, faults in the surface of the culture medium, damage to the plurality of plastic carriers, and an impermissible labeling of the plurality of plastic carriers; and storing a result of the evaluation step, wherein, when recording the images, an entire surface of the plurality of plastic carriers and the covers is shown at a same time on a camera unit, wherein the inspection routine is performed multiple times, wherein different illumination sources are used for recording multiple images, the illumination sources carrying out a transmitted light illumination and a diffuse illumination in incident light.

19. A method for an automatic inspection of a plurality of plate-like plastic carriers, each plastic carrier being closed by a cover and having a unique identification code and a culture medium, the method comprising:

providing a storage container including the plastic carriers;

providing a computer-controlled handling unit including an optical inspection system, the computer-controlled handling unit being designed as a part of a robot; and performing the automatic inspection in an inspection routine, the inspection routine comprising:

removing one of the plastic carriers from the storage container with the aid of the handling unit;

subsequently removing the cover of the one of the plastic carriers;

supplying the one of the plastic carriers to the optical inspection system;

reading the identification code of the one of the plastic carriers before or after the one of the plastic carriers is removed from the storage container;

recording at least one image, with a light, of the one of the plastic carriers including a surface of the culture medium;

during said recording the at least one image, the surface of the one of the plastic carriers is displayed to a camera unit;

in an evaluation step, evaluating the at least one image for faults as a growth of germs, faults in the surface of the culture medium, and damage to the one of the plastic carriers; and storing a result of the evaluation step, wherein the inspection routine is performed multiple times, wherein at least one illumination source is used for recording the at least one image, the at least one illumination source being a transmission light illumination source.

20. The method for an automatic inspection according to claim 19, wherein multiple images are recorded at a single viewing angle or from multiple angles with the aid of the inspection unit.

21. The method for an automatic inspection according to claim 20, wherein different light sources are used for recoding the multiple images, and wherein at least one of the illumination sources is an incident light illumination source.

* * * * *